(12) United States Patent
Jess

(10) Patent No.: US 8,280,715 B2
(45) Date of Patent: Oct. 2, 2012

(54) STORAGE SYSTEM MANAGEMENT TOOL INCLUDING SIMULATION MODE TO SUPPORT PRE-CONFIGURATION OF STORAGE SYSTEMS

(75) Inventor: Martin Jess, Erie, CO (US)

(73) Assignee: LSI Corporation, Milpitas, CA (US)

( * ) Notice: Subject to any disclaimer, the term of this patent is extended or adjusted under 35 U.S.C. 154(b) by 417 days.

(21) Appl. No.: 12/455,747

(22) Filed: Jun. 5, 2009

(65) Prior Publication Data

US 2010/0312540 A1 Dec. 9, 2010

(51) Int. Cl.
  G06F 9/44 (2006.01)
  G06F 13/10 (2006.01)
  G06F 13/12 (2006.01)
  G06F 17/50 (2006.01)
  G06F 7/62 (2006.01)

(52) U.S. Cl. .......................... 703/21; 703/13
(58) Field of Classification Search ............ 703/21, 703/13
  See application file for complete search history.

(56) References Cited

U.S. PATENT DOCUMENTS

| | | | |
|---|---|---|---|
| 6,002,854 A * | 12/1999 | Lynch et al. | 703/1 |
| 6,615,406 B1 * | 9/2003 | Amberg et al. | 717/177 |
| 7,631,262 B1 * | 12/2009 | Knight et al. | 715/735 |
| 2004/0254777 A1 * | 12/2004 | Foreman et al. | 703/21 |
| 2006/0129781 A1 * | 6/2006 | Gellai et al. | 711/170 |
| 2006/0250766 A1 * | 11/2006 | Blaalid et al. | 361/685 |
| 2008/0126788 A1 * | 5/2008 | Kreek et al. | 713/100 |

OTHER PUBLICATIONS

Dufrasne, Bertrand et al. "Redbooks Paper: Introducing IBM TotalStorage FAStT EXP100 with SATA Disks", 2004, IBM Corp.*

* cited by examiner

*Primary Examiner* — Kandasamy Thangavelu
*Assistant Examiner* — Cedric D Johnson
(74) *Attorney, Agent, or Firm* — Suiter Swantz pc llo

(57) ABSTRACT

A method may include receiving a first selection via a user interface comprising a hardware configuration for a simulated computer storage system, the hardware configuration including a plurality of hardware components. The method may also include receiving a second selection via the user interface comprising a storage configuration for the plurality of hardware components of the simulated computer storage system. Further, the method may include creating a storage configuration template utilizing the storage configuration. Additionally, the method may include associating the plurality of hardware components of the simulated computer storage system with the storage configuration template. Further, the method may include storing the plurality of hardware components of the simulated computer storage system and the associated storage configuration template.

12 Claims, 3 Drawing Sheets

STORAGE SYSTEM MANAGEMENT TOOL INCLUDING SIMULATION MODE TO SUPPORT PRE-CONFIGURATION OF STORAGE SYSTEMS

TECHNICAL FIELD

The present disclosure generally relates to the field of computer storage, and more particularly to a storage system management tool including a simulation mode to support pre-configuration of storage systems.

BACKGROUND

Computer storage systems may be logically distinguished by two types of configurations. One configuration is a hardware configuration, which is the collection of hardware components constituting the storage system. For example, a hardware configuration may include a controller model, a controller enclosure, a number of controllers, a number of drive trays, a model of drive trays, a number and model of drives, or the like. Another configuration for a computer storage system is a storage configuration, which determines the logical storage entities of the system. For instance, a storage configuration may include drive groups, Redundant Array of Inexpensive Disks (RAID) volumes, hot spare drives, or the like.

When a customer orders a computer storage system, the customer will generally specify a hardware configuration as part of the order (e.g., utilizing a bill of materials). Then, when the system is delivered, the storage configuration will typically be configured (e.g., by the customer's Information Technology (IT) staff). The storage configuration must be configured before customer data can be loaded onto the system, in preparation for putting the storage system into production. This process can be time consuming, and particularly expensive for large customers, who may order a large number of storage systems in one order, and then have to install and configure the systems before putting them into production.

SUMMARY

A method may include receiving a first selection via a user interface comprising a hardware configuration for a simulated computer storage system, the hardware configuration including a plurality of hardware components. The method may also include receiving a second selection via the user interface comprising a storage configuration for the plurality of hardware components of the simulated computer storage system. Further, the method may include creating a storage configuration template utilizing the storage configuration. Additionally, the method may include associating the plurality of hardware components of the simulated computer storage system with the storage configuration template. Further, the method may include storing the plurality of hardware components of the simulated computer storage system and the associated storage configuration template.

A system may include a user interface for receiving a first selection comprising a hardware configuration including a plurality of hardware components for a simulated computer storage system, and a second selection comprising a storage configuration for the plurality of hardware components of the simulated computer storage system. The system may also include a processor for creating a storage configuration template utilizing the storage configuration and associating the plurality of hardware components of the simulated computer storage system with the storage configuration template. Additionally, the system may include a memory for storing the plurality of hardware components of the simulated computer storage system and the associated storage configuration template.

A computer program product may include a signal bearing medium bearing one or more instructions for receiving a first selection via a user interface comprising a hardware configuration for a simulated computer storage system, the hardware configuration including a plurality of hardware components. The computer program product may also include one or more instructions for receiving a second selection via the user interface comprising a storage configuration for the plurality of hardware components of the simulated computer storage system. Further, the computer program product may include one or more instructions for creating a storage configuration template utilizing the storage configuration. Additionally, the computer program product may include one or more instructions for associating the plurality of hardware components of the simulated computer storage system with the storage configuration template. Further, the computer program product may include one or more instructions for storing the plurality of hardware components of the simulated computer storage system and the associated storage configuration template.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

One technique for reducing the time and cost associated with installing and configuring a computer storage system is to allow a customer to duplicate a previous configuration. For example, a customer may configure one particular storage system and then store the configuration as a template or file. Then, the configuration template can be applied to other storage systems having the same hardware configuration as the original system. In this manner, the customer may utilize the same storage configuration as the original system. However, when utilizing this technique, the customer has to install and configure at least one actual storage system before creating a storage configuration template.

Because it may not be possible to create the template before an order arrives, a large customer may have a number of unconfigured storage systems waiting to be deployed until a "master" system is configured along with its corresponding storage configuration template. Then, the customer's IT staff must apply the resulting storage configuration template to each system. This may take a significant amount of time per system (e.g., in a case where a large RAID volumes needs to be initialized to all zeroes). Also, when new storage system models and hardware configurations are ordered, a storage configuration template must be created and applied to each such hardware configuration.

Figure 1:
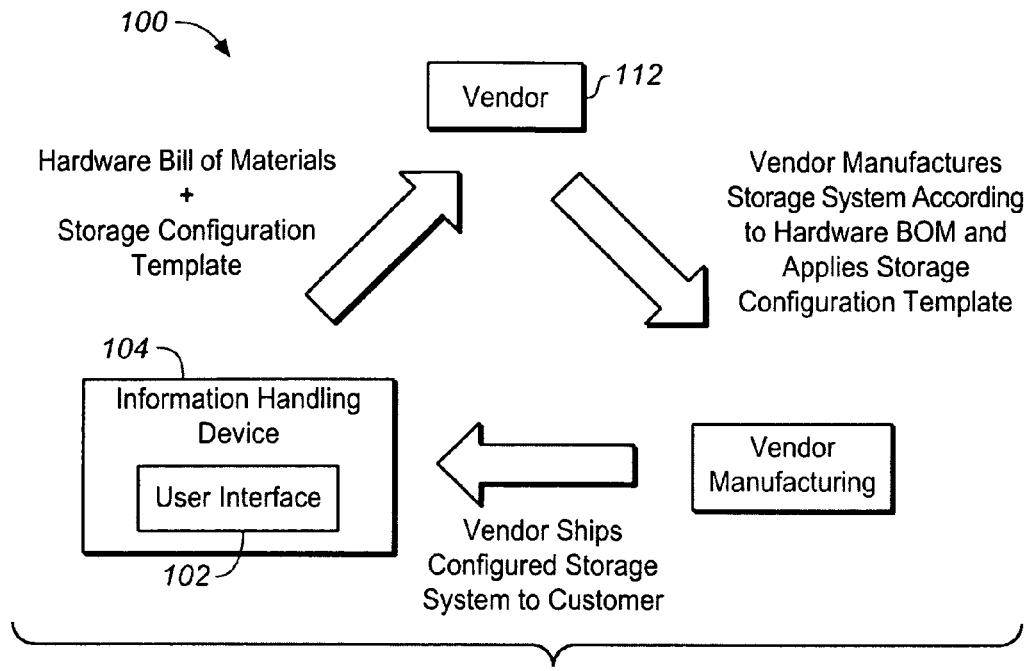
FIG. 1 is a process flow diagram illustrating a process for configuring a storage system.
Figure 2:
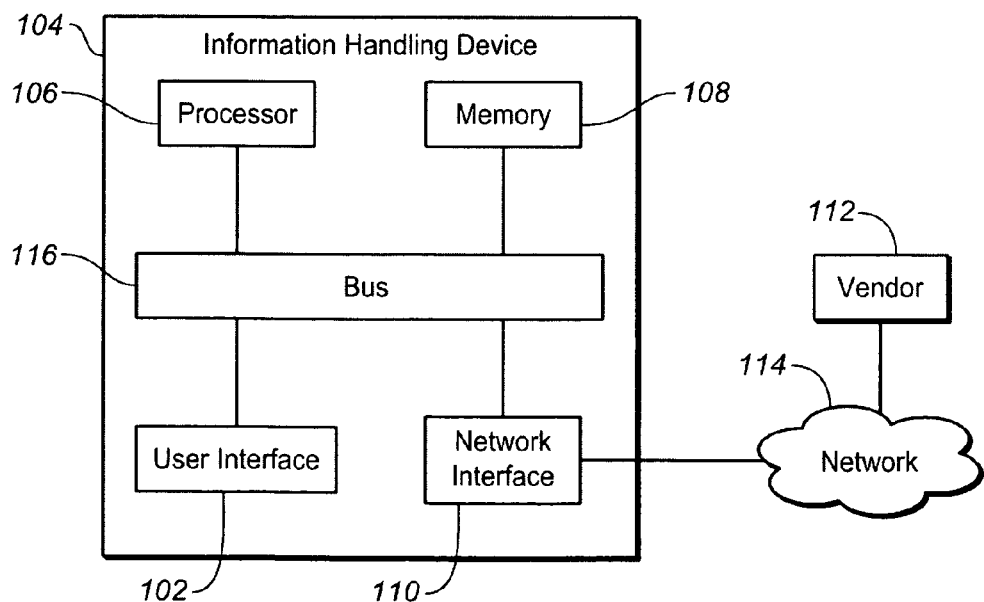
FIG. 2 is a block diagram illustrating an information handling device connected to a vendor via a network connection.

Referring now to FIGS. 1 and 2, a system 100 is described in accordance with the present disclosure. The system 100 includes a storage system management tool (e.g., a user interface such as a graphical user interface 102). The graphical user interface 102 implements a simulation mode for the storage system management tool such that a storage configuration can be created for a simulated computer storage system and stored as a template in a file, all without an actual storage system being present. The storage configuration template may also be referred to as a simulated configuration template.

In simulation mode, the storage system management tool also provides a user with a capability for defining the hardware configuration of the simulated computer storage system, e.g., the controller enclosure model, the number of controllers and model, the number of drive trays and model, and/or the number of drives per tray and model. Further, the user has the option to store the list of selected hardware components as a Bill Of Materials (BOM) in a file, which may be referred to as the BOM file.

The system 100 also includes the capability to load a simulated configuration template for a storage system, verify that the configuration is applicable to the storage system's hardware configuration, and apply the storage configuration to the system. For example, in an embodiment, the storage system may verify that its actual hardware components match those utilized in the simulated configuration (e.g., the number of controllers, the controller model, the controller type, and the like).

Thus, the capabilities of the system 100 allow a customer to execute a storage system's native management tool in simulation mode, create a simulated computer storage system hardware configuration, configure the simulated computer storage system as if it was a real storage system, store the BOM and the simulated configuration template in files, and then send these files to the vendor. Upon receipt of these files, the vendor can manufacture a storage system according to the BOM file and then apply the simulated configuration to the storage system before shipping it to the customer.

Thus, the system 100 of the present disclosure allows the storage system to arrive at the customer's site with both the desired hardware configuration and the desired storage configuration. When the customer receives the pre-configured storage system, the customer then completes the physical connections (e.g., connecting cables) for the storage system, powers it on, loads the customer data (e.g., into the pre-configured RAID volumes), and then the storage system is ready for operation.

It is further contemplated that a customer may send various simulated configuration templates and hardware BOMs to a vendor (e.g., a vendor's professional services organization), who may then load the user configurations into a blank storage system and then do performance tests and benchmarking remotely for the user. In this manner, a customer may select a preferred hardware and storage configuration template from the test results.

Alternatively, a customer may send a real storage configuration and hardware BOM from an operational storage system where a problem has been encountered. These may be sent to a support organization, along with log files, and the like. The support organization can then utilize these configuration files to quickly recreate the customer's configuration on a blank storage system (e.g., in a lab setting) and troubleshoot the problem more easily. This may require less communication with a customer, and the support staff would not necessarily have to be on site.

The system 100 may include an information handling device 104. The information handling device 104 includes a user interface 102 for receiving a first selection comprising a hardware configuration including a plurality of hardware components for a simulated computer storage system, and a second selection comprising a storage configuration for the plurality of hardware components of the simulated computer storage system. The storage configuration selection may include creating drive groups and RAID volumes, configuring Logical Unit Number (LUN) masking, hot spare drives, mirrors, or the like. Further, the information handling device 104 includes a processor 106 for creating a storage configuration template utilizing the storage configuration and associating the plurality of hardware components of the simulated computer storage system with the storage configuration template. The information handling device 104 also includes a memory 108 for storing the plurality of hardware components of the simulated computer storage system and the associated storage configuration template.

In an embodiment, the user interface 102 may include a Graphical User Interface (GUI). Further, the memory 108 for storing the plurality of hardware components may include at least one of a controller enclosure model, a number of controllers, a model of controllers, a number of drive trays, a model of drive trays, a number of drives per tray, and a number of drives per model. The plurality of hardware components may be stored as a Bill Of Materials (BOM) file. The information handling device 104 may also include a network interface 110 for providing the plurality of hardware components of the simulated computer storage system and the associated storage configuration template to a vendor 112 of the plurality of hardware components.

The vendor 112 and the information handling device 104 may be connected via a network 114, such as an internet, the Internet, an intranet, an Ethernet, a Wide Area Network (WAN), a Local Area Network (LAN), or another type of network. Further, the storage configuration template is configured for the vendor 112 to load the storage configuration into a manufactured storage system including the plurality of hardware components. The user interface 102, the processor 106, the memory 108, and the network interface 110 may be connected via a bus 116. It is contemplated that the BOM and/or the template may be transferred to the vendor in a variety of ways, including via email, file transfer, a virtual private network, and the like.

Figure 3:
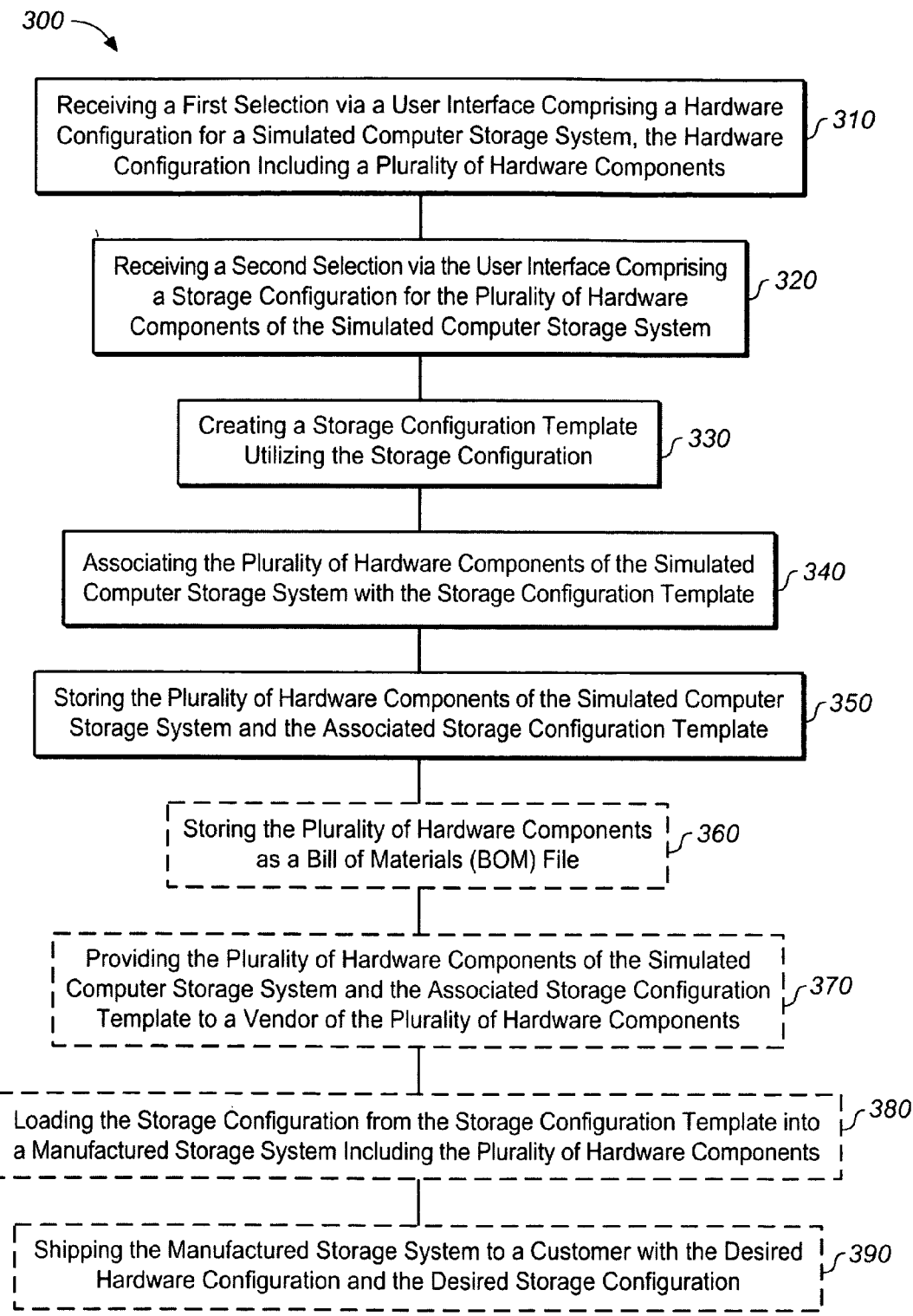
FIG. 3 is a flow diagram illustrating a method for configuring a storage system.

Referring now to FIG. 3, a method 300 is described in accordance with the present disclosure. The method 300 includes receiving a first selection comprising a hardware configuration for a simulated computer storage system. The first selection is received via a user interface. The hardware configuration includes a plurality of hardware components, 310. Next, a second selection is received via the user interface comprising a storage configuration for the plurality of hardware components of the simulated computer storage system, 320. Next, a storage configuration template is created utilizing the storage configuration, 330. Then, the plurality of hardware components of the simulated computer storage system is associated with the storage configuration template, 340. Finally, the plurality of hardware components of the simulated computer storage system and the associated storage configuration template are stored, 350.

In an embodiment, the plurality of hardware components is stored as a BOM file, 360. In an embodiment, the plurality of hardware components of the simulated computer storage system and the associated storage configuration template are provided to a vendor of the plurality of hardware components, 370. Next, the storage configuration from the storage configuration template is loaded into a manufactured storage system including the plurality of hardware components, 380. Finally, the manufactured storage system is shipped to a customer with the desired hardware configuration and the desired storage configuration, 390.

Figure 4:
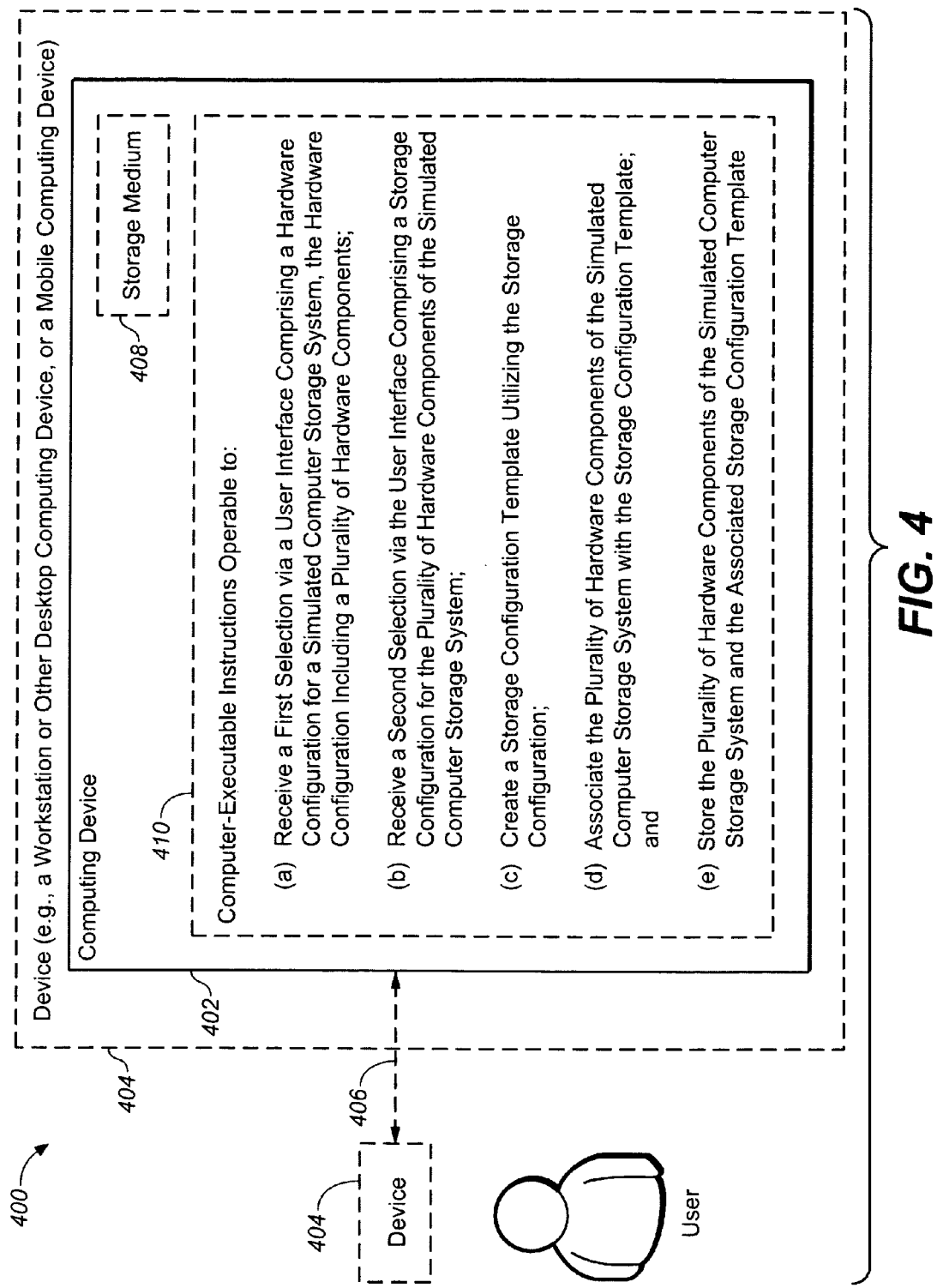
FIG. 4 illustrates a system in accordance with the present disclosure.

FIG. 4 illustrates an example system 400 in which embodiments may be implemented. The system 400 includes a computing system environment. The system 400 also illustrates a user utilizing a device 404, which is optionally shown as being in communication with a computing device 402 by way of an optional coupling 406. The optional coupling 406 may represent a local, wide-area, or peer-to-peer network, or may represent a bus that is internal to a computing device (e.g., in example embodiments in which the computing device 402 is contained in whole or in part within the device 404). A storage medium 408 may be any computer storage media.

The computing device 402 includes computer-executable instructions 410 that when executed on the computing device 402 cause the computing device 402 to receive a first selection via a user interface comprising a hardware configuration for a simulated computer storage system, the hardware configuration including a plurality of hardware components; receive a second selection via the user interface comprising a storage configuration for the plurality of hardware components of the simulated computer storage system; create a storage configuration template utilizing the storage configuration; associate the plurality of hardware components of the simulated computer storage system with the storage configuration template; and store the plurality of hardware components of the simulated computer storage system and the associated storage configuration template. As referenced above and as shown in FIG. 4, in some examples, the computing device 402 may optionally be contained in whole or in part within the device 404.

In FIG. 4, then, the system 400 includes at least one computing device (e.g., 402 and/or 404). The computer-executable instructions 410 may be executed on one or more of the at least one computing device. For example, the computing device 402 may implement the computer-executable instructions 410 and output a result to (and/or receive data from) the computing device 404. Since the computing device 402 may be wholly or partially contained within the computing device 404, the device 404 also may be said to execute some or all of the computer-executable instructions 410, in order to be caused to perform or implement, for example, various ones of the techniques described herein, or other techniques.

The device 404 may include, for example, a portable computing device, workstation, or desktop computing device. In another example embodiment, the computing device 402 is operable to communicate with the device 404 associated with the user to receive information about the input from the user for performing data access and data processing and presenting an output of the software test cycle effectiveness function at least partly based on the user data.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method, comprising:
receiving a first selection via a user interface comprising a storage hardware configuration for a simulated computer storage system, the storage hardware configuration including a plurality of storage hardware components wherein the configuration of the plurality of storage hardware components comprises a controller enclosure model, a number of each controller model, a model of each controller type, a model of drive trays, a number of each drive tray model, a number of drives per tray for each model, and a number of drives per model;
receiving a second selection via the user interface comprising a storage configuration for the plurality of storage hardware components of the simulated computer storage system, the storage configuration including at least one of a RAID volume, a logical unit number masking, a hot spare drive, or a mirror;
creating a storage configuration template utilizing the storage configuration;
associating the plurality of storage hardware components of the simulated computer storage system with the storage configuration template;
storing a configuration of the plurality of storage hardware components of the simulated computer storage system and the associated storage configuration template; and
loading the storage configuration from the storage configuration template into a manufactured storage system including the configuration of the plurality of storage hardware components.

2. The method of claim 1, wherein the user interface comprises a Graphical User Interface (GUI).

3. The method of claim 1, further comprising:
storing the plurality of storage hardware components as a Bill Of Materials (BOM) file.

4. The method of claim 1, further comprising:
providing the plurality of storage hardware components of the simulated computer storage system and the associated storage configuration template to a vendor of the plurality of storage hardware components.

5. The method of claim 1, further comprising:
shipping the manufactured storage system to a customer with the desired storage hardware configuration and the desired storage configuration.

6. A system, comprising:
a user interface for receiving a first selection comprising a storage hardware configuration including a plurality of storage hardware components for a simulated computer storage system wherein the configuration of the plurality of storage hardware components comprises a controller enclosure model, a number of each controller model, a model of each controller type, a model of drive trays, a number of each drive tray model, a number of drives per tray for each model, and a number of drives per model, and a second selection comprising a storage configuration for the plurality of storage hardware components of the simulated computer storage system, the storage configuration including at least one of a RAID volume, a logical unit number masking, a hot spare drive, or a mirror;

a processor for creating a storage configuration template from the storage configuration and associating the plurality of storage hardware components of the simulated computer storage system with the storage configuration template;

a memory for storing a configuration of the plurality of storage hardware components of the simulated computer storage system and the associated storage configuration template; and a network interface for providing the plurality of storage hardware components of the simulated computer storage system and the associated storage configuration template to a vendor of the plurality of storage hardware components, wherein the storage configuration template is configured for the vendor to load the storage configuration into a manufactured storage system including the configuration of the plurality of storage hardware components.

7. The system of claim 6, wherein the user interface comprises a Graphical User Interface (GUI).

8. The system of claim 6, wherein the plurality of storage hardware components is stored as a Bill Of Materials (BOM) file.

9. A computer program product including a set of instructions stored on a non-transitory computer readable medium and executed by a device, comprising:

one or more instructions for receiving a first selection via a user interface comprising a storage hardware configuration for a simulated computer storage system, the storage hardware configuration including a plurality of storage hardware components wherein the configuration of the plurality of storage hardware components comprises a controller enclosure model, a number of each controller model, a model of each controller type, a model of drive trays, a number of each drive tray model, a number of drives per tray for each model, and a number of drives per model;

one or more instructions for receiving a second selection via the user interface comprising a storage configuration for the plurality of storage hardware components of the simulated computer storage system, the storage configuration including at least one of a RAID volume, a logical unit number masking, a hot spare drive, or a mirror;

one or more instructions for creating a storage configuration template from the storage configuration;

one or more instructions for associating the plurality of storage hardware components of the simulated computer storage system with the storage configuration template;

one or more instructions for storing a configuration of the plurality of storage hardware components of the simulated computer storage system and the associated storage configuration template;

one or more instructions for providing the plurality of hardware components of the simulated computer storage system and the associated storage configuration template to a vendor of the plurality of hardware components; and one or more instructions for loading the storage configuration from the storage configuration template into a manufactured storage system including the configuration of the plurality of storage hardware components.

10. The computer program product of claim 9, wherein the user interface comprises a Graphical User Interface (GUI).

11. The computer program product of claim 9, further comprising:

one or more instructions for storing the plurality of storage hardware components as a Bill Of Materials (BOM) file.

12. The computer program product of claim 9, further comprising one or more instructions for shipping the manufactured storage system to a customer with the desired storage hardware configuration and the desired storage configuration.

* * * * *